United States Patent [19]

Randa

[11] Patent Number: 4,711,811

[45] Date of Patent: Dec. 8, 1987

[54] THIN WALL COVER ON FOAMED INSULATION ON WIRE

[75] Inventor: Stuart K. Randa, Wilmington, Del.

[73] Assignee: E. I. Du Pont de Nemours and Company, Wilmington, Del.

[21] Appl. No.: 924,301

[22] Filed: Oct. 22, 1986

[51] Int. Cl.$^4$ .............................................. B32B 27/00
[52] U.S. Cl. .................................... 428/383; 428/375; 428/379; 428/380; 428/421; 428/422; 174/110 F; 174/110 FC; 174/120 C; 174/120 R; 174/120 SR; 174/121 SR
[58] Field of Search ............... 428/380, 383, 421, 422, 428/375, 379; 174/110 F, 110 FC, 120 R, 120 C, 121 SR, 120 SR

[56] References Cited

U.S. PATENT DOCUMENTS

| | | | |
|---|---|---|---|
| 3,072,583 | 1/1963 | Randa | 260/2.5 |
| 3,105,827 | 10/1963 | Kaufman | 428/421 |
| 3,352,714 | 11/1967 | Anderson et al. | 428/383 |
| 3,516,859 | 6/1970 | Gerland et al. | 428/380 |
| 4,309,160 | 1/1982 | Poutanen et al. | 425/113 |
| 4,330,685 | 5/1982 | Bleikamp, Jr. | 174/110 F |
| 4,331,619 | 5/1982 | Chung et al. | 264/13 |

FOREIGN PATENT DOCUMENTS

| | | | |
|---|---|---|---|
| 169304 | 1/1986 | European Pat. Off. | 428/421 |
| 10735 | 1/1977 | Japan | 428/421 |

OTHER PUBLICATIONS

Maillefer Technical Report #17.
Abstract of Japanese Patent J57-119412A, Jan. 19, 1981.
Randa, S. K., "Extrusion Foaming of Coaxial Cables of Melt-Fabricable Fluorocarbon Resins", 30th International Wire and Cable Symposium (1981).

Primary Examiner—Marion C. McCamish
Assistant Examiner—S. A. Gibson

[57] ABSTRACT

This invention relates to the use of ethylene/tetrafluoroethylene (ETFE) or ethylene/chlorotrifluoroethylene (ECTFE) polymers to produce a foamed coating of insulation over wire and used as wire pairs for transmitting electronic signals, in which the foamed coating is surrounded by a protective jacket or skin made of one of the two polymers.

5 Claims, No Drawings

THIN WALL COVER ON FOAMED INSULATION ON WIRE

FIELD OF THE INVENTION

This invention relates to the use of perfluorinated tetrafluoroethylene (TFE) copolymers to produce a foamed coating of insulation over wire for transmitting electronic signals, in which the foamed coating is surrounded by a protective jacket or skin made of ethylene/tetrafluoroethylene (ETFE) copolymer or ethylene/chlorotrifluoroethylene (ECTFE) copolymer.

BACKGROUND OF THE INVENTION

Electrical wire is used to transmit electronic signals. The wire must be protected, or insulated, and plastic coatings are ordinarily extruded from a molten state onto and around the wire. These plastic materials are chosen to have a low dielectric constant and a low dissipation factor. It has previously been found that if the plastic is foamed as it is applied to the wire, the dielectric constant is desirably lowered, due to the formation of numerous small cells in the foam.

Foamed insulation around transmission wire is described in U.S. Pat. No. 3,072,583 to S. K. Randa where he describes a nucleated foaming process for extruding perfluorinated polymer (e.g., fluorinated ethylene propylene (FEP) copolymer), foam with a dissolved gas blowing agent. Because of its high viscosity, FEP foam is difficult to extrude onto wire at high rates.

U.S. Pat. Nos. 4,331,619 and 4,394,460 to Chung et al. relate to a nucleated, chemically blown foam composition based on partially fluorinated copolymers, such as ethylene-chlorotrifluoroethylene copolymers. This patent describes the foam on wire only in terms of average cell size. It does not address the problem of low dielectric strength due to structural failure of the foam. Foam insulation can be weakened structurally and electrically when several foam cells are aligned radially between the wire and the outer surface of the foam insulation, and/or when two or more foam cells substantially larger than average are so aligned, or when the size of a single cell approaches the thickness of the insulation. Electrical test data are not reported in these patents, but the Examples imply that pin holes are present in the coating, by stating that "a minimum of pinholes appear at the surface".

Sometimes a skin or jacket is placed around the foam wire construction to protect the assembly. For example, U.S. Pat. No. 4,309,160 to Poutanen et al. discloses an apparatus and a method for forming a foam and an unfoamed skin around telephone wire. The patent points out that the foam provides good electrical properties (i.e., low dielectric constant) and the unfoamed outer layer, or skin, provides good mechanical properties. In this patent, the foam and skin are made of the same plastic material, but fluorinated polymers are not mentioned.

Similarly, Maillefer Technical Report 17 teaches extrusion techniques for foam-skin extrusion onto wire. It deals mainly with polyethylene foam/polyethylene skin constructions, and does not suggest the use of fluorine-containing polymers.

There is a need for high speed extrusion of both foam and skin onto electrical wire.

SUMMARY OF THE INVENTION

This invention comprises foamed coatings of high electrical quality around a center wire, covered by an outer unfoamed polymer skin for protection. The perfluorinated melt-processable copolymer foam is preferably a copolymer of tetrafluoroethylene and a comonomer selected from hexafluoropropylene (HFP), perfluoro(propyl vinyl ether) (PPVE), or mixtures thereof. The skin is made of a different copolymer, namely a copolymer of ethylene/tetrafluoroethylene (ETFE) or a copolymer of ethylene/chlorotrifluoro- ethylene (ECTFE).

DESCRIPTION OF THE INVENTION

The ETFE and ECTFE skin copolymers contain about 40-60 mole % ethylene (E), and 60-40 mole % tetrafluoroethylene (TFE) or chlorotrifluoroethylene (CTFE), and may also contain up to 10 mole % of a copolymerizable monomer which is substantially free of telogenic activity. This termonomer may preferably be hexafluoroisobutylene or a vinyl monomer which provides a side chain having at least two carbon atoms as described in U.S. Pat. No. 3,342,777; or a perfluoroalkyl ethylene having the formula $CH_2=CHR_f$ as described in U.S. Pat. No. 4,123,602. The ethylene skin copolymers generally should have melt viscosities in the range of 0.5 to $0.9 \times 10^4$ poise at 298° C. as measured by ASTM D-1238. If the skin has a lower melt viscosity than the foam polymer, it facilitates extrusion of the skin around the foam.

The TFE copolymers that form the foam are melt processable copolymers, i.e., the molecular weight of the copolymer is low enough and the content of the comonomer is great enough to cause the melt viscosity of the copolymer to be below $10 \times 10^4$ poise at 372° C. In general, the amount of PPVE will be at least 2 wt. %; the amount of HFP will be at least 10 wt. %; and if both are present, the combined amount will be at least 4 wt. %.

The foam provides a low dielectric constant. The skin is not foamed and has a high dielectric constant, but the skin does not significantly shift the mutual capacitance properties as measured between pairs in the cable assembly.

The selection of ETFE or ECTFE materials for the skin for telecommunications wire and cable (telephone and optical fiber) and of the TFE copolymer for the foam is an advantageous construction. The foam provides good electrical properties, heat resistance, and flame resistance, while the ECTFE or ETFE skin provides surprising improvements in crush resistance, dielectric strength, colorability, and ease of fabrication.

The invention provides foam insulation around wire protected by a thin hard skin or jacket. Thinner walls are desirable because space is saved. For example, a 24 AWG solid wire with a 0.125 mm (5 mil) wall of foam insulation around it has an outside diameter of only 0.76 mm (30 mil), whereas if the wall is 0.5 mm (20 mil) thick, the diameter is 1.5 mm (60 mil), about twice as great.

Twisted wire pairs, i.e., two insulated wires twisted around each other, are traditionally used to transmit electrical signals. Twisted wires are advantageous because of their simplicity. The lower the insulation's dielectric constant, the better the speed and quality of the signal. The TFE copolymer resin used as the foam in this invention has a very low dielectric constant, and foaming the resin further decreases dielectric constant to make the insulation even more desirable. Unfortunately, the twisting of a foam-insulated wire tends to crush the foam, causing increased mutual capacitance and sometimes decreased dielectric strength.

To improve mechanical strength, a thin skin (5% to 35% of the entire insulation thickness) of an unfoamed ETFE or ECTFE copolymer is used in this invention as an over-coating. This skin can be applied in a secondary extrusion or in a dual simultaneous extrusion.

The outer coating, with its higher dielectric constant, was found to have little influence on the overall dielectric constant and, in turn, little influence on the transmitted speed and quality of the signal. Therefore, the unfoamed tough skin can be positioned on the exterior of the foam without detracting from the cable performance. With the protective skin present, the inner coating can be foamed to even a higher degree of voids. Furthermore, if the skin polymer has high melt fluidity, this will aid in the extrudability of the total composition in a simultaneous extrusion. The skin provides greater resistance to crushing forces such as are encountered in making twisted pairs.

Without these tougher outer coatings, it is difficult to make miniature (i.e., thin insulations) twisted pair wire structures having the low mutual capacitances (5 to 15 pf/ft) needed for cable systems and still having adequate dielectric strength between pairs.

Typically, the foam-skin composites described are 25–70% void content foam with a wall thickness of 2–30 mils (0.05–0.76 mm) covered by a solid skin of 0.5–10 mils (0.013–0.254 mm) thickness, and an average cell size of 0.05–0.12 mm (2–5 mils) (closer to 0.05 mm in thin insulations and closer to 0.12 mm in thicker insulations).

An equipment set-up for the simultaneous extrusion of foam and skin on wire consists of a 2″ (5 cm) diameter Davis Standard extruder with a 24/1 length to diameter (L/D) ratio equipped with a DC drive motor capable of at least 50 rpm screw speed, screws designed for foaming using "Freon" 22 fluorocarbon gas injection (see FIG. 1 of Wire and Cable Symposium paper, "Equipment and Design Changes in Extrusion of Foamed Fluoropolymer Resins", November 1983), an auxiliary 1″ (2.54 cm) diameter screw extruder standard for extrusion of unfoamed fluoropolymers, with a 20/1 L/D used to provide the melt which forms the outer skin, an electronic wire preheater, a commercial dual coating foam-skin crosshead with an extrusion die, a water bath, a capstan with an AC motor drive capable of wire speeds of 50 fpm to as high as 5,500 fpm, (15–1675 meter/min), and in-line electronic equipment for the continuous monitoring of the insulated wire diameter and capacitance. The melt pressure of the molten resin is observed and the wire speed adjusted or extrusion speed adjusted accordingly.

Any liquid or gaseous foaming agent can be used to promote foam formation. The TFE copolymer to be foamed may contain a nucleating agent such as boron nitride. The foam and the skin can be extruded onto wire in any conventional fashion.

EXAMPLE 1

In Example 1, the equipment used was as described above. A tubing melt draw die having a 0.197 inch die orifice was used with a tip diameter of 0.078 inch in a Maillefer foam/skin crosshead setup. Dies having internal angles from 15° to 60° can be used. Barrel, adaptor and crosshead temperatures of 680° F. (360° C.) were employed. The die temperature was 590° F. (310° C.), the melt pressure was 1900 psi (13.1 MPa), "Freon" 22 fluorocarbon gas pressure of 69 psig (0.5 MPa) was used with 0.5% boron nitride-filled FEP 100, the screw speed was 15 rpm (4.6 m/min) and the wire speed was 120 ft/min (36.6 m/min). Resin shear rate at the die surface was calculated as 300 reciprocal seconds.

In this Example, a foam of an 89 TFE/11 hexafluoropropylene (by weight) copolymer and a skin of ethylene/tetrafluoroethylene (ETFE) copolymer were simultaneously extruded to form insulation around a wire.

ETFE, about 50/50 mole % with a small amount of perfluorobutyl ethylene termonomer (about 20.4 wt.% ethylene, 77.5 wt. % tetrafluoroethylene and 2.1 wt. % $C_4F_9CH=CH_2$) of melt viscosity $0.9 \times 10^4$ poise was used as the skin. The TFE/HFP prior to extrusion had a melt viscosity of $8.4 \times 10^4$ P at 372° C. AWG 24 solid copper wire (20.1 mil [0.5 mm] in diameter) was used. The FEP foam cells were closed and averaged 5 mils (127 micrometers) in diameter as determined by measuring enlarged cross-sectional photographs of the samples. The foam was 21 mils (0.5 mm) thick and the skin 2 mils (51 micrometers). The wire construction possessed a coaxial cable capacitance of 25±0.7 pF/ft. or 82±2.3 pF/m. This corresponds to a dielectric constant of 1.64.

Subsequent electrical tests showed the following results.

Dielectric strength was tested as described in ASTM D-3032. Three foot sample lengths were aged four hours, salt water soaked, then tested dielectrically when immersed in the water solution.

Two wires were prepared. In one the ETFE was pigmented red, in the other, green.

For the red colored sample, the voltage was 13,330 V (average of 3 tests). But when the skin was removed (1.5 mil or 38 micrometers) before the soak, the voltage was only 9,830 V (average of 3 tests).

For the green colored sample, the voltage was 12,830 V (average of 3 tests). But when the skin (2.5 mil or 64 micrometers) was removed before the soak, the voltage was only 3,330 V (average of 3 tests).

These results show the increased dielectric strength in the wire constructions to the presence of the ETFE unfoamed skin. The reason for the difference in FEP foam in both instances after skin was removed is not known, but may relate to cell size or shape.

EXAMPLE 2

In this Example, a foam of a 97 TFE/3 PPVE (weight %) copolymer with melt viscosity of $3.7 \times 10^4$ poise at 372° C. and a skin of ETFE copolymer were simultaneously extruded to form an insulation around a wire. The ETFE resin was the same as that used in Example 1. The wire was AWG 18 stranded copper wire. The TFE/PPVE copolymer contained 0.5% BN as a nucleating agent.

The extruder used for the ETFE skin was the same as that used in Example 1. The barrel temperature was 316° C. and the screw speed was 3 rpm.

The extruder used for the TFE/PPVE copolymer was a 1.25″ (3.2 cm) extruder with a 30/1 L/D, designed for gas injection as was the extruder in Example 1. The barrel temperature was 343° C. and the screw speed was 35 rpm.

The crosshead was the same as that used in Example 1 except the die diameter was 0.295 inches (7.5 mm) and the tip diameter was 0.15 inches (3.8 mm). The crosshead temperature was 332° C. and the die temperature was 299° C. The wire speed was 90 feet/minute (27.4 m/min). "Freon" 22 fluorocarbon gas pressure was 110 psig (0.8 MPa).

The coated wire had a foam coating of 20 mils (510 micrometers) of TFE/PPVE, covered with an unfoamed skin of ETFE of 2 mils (51 micrometers). The coated wire had a dielectric constant of 1.58 and a coaxial cable capacitance of 45 plus or minus 1 pF/ft (148 plus or minus 3 pF/m).

EXAMPLE 3

In this Example, a foam of TFE/PPVE copolymer and a skin of ECTFE (ethylene/chlorotrifluoroethylene) copolymer were simultaneously extruded to form an insulation around a wire.

The TFE/PPVE copolymer was the same as that used in Example 2, including the BN nucleating agent.

The ETCFE resin was the most fluid ECTFE currently available. It had a melt viscosity of $0.61 \times 10^4$ poise at 297° C.

The extruder used for the ECTFE skin was the same as that used in the other examples. The barrel temperature was 282° C. and the screw speed was 8 rpm.

The extruder used for the TFE/PPVE copolymer was the same as that used in Example 2 for the same polymer. The barrel temperature was 343° C. and the screw speed was 35 rpm.

The crosshead was the same as that used in Example 2. "Freon" 22 fluorocarbon gas pressure was 110 psig (0.8 MPa). The crosshead temperature was 293° C. and the die temperature was 304° C. The wire was AWG 18 stranded copper wire construction, and the wire speed was 122 feet/minute (37.2 m/min).

The coated wire had a 17 mil (430 micrometers) foamed coating of TFE/PPVE copolymer, covered with an unfoamed skin of 3 mils (76 micrometers) of ECTFE. This insulated wire had a dielectric constant of 1.56 and a coaxial cable capacitance of 47 pF/ft (154 pF/m).

I claim:
1. A wire substantially covered with a fluoropolymer foam made of a melt-processible perfluorinated copolymer of tetrafluoroethylene and an unfoamed skin around the foam comprising ethylene/chlorotrifluoroethylene copolymer or ethylene/tetrafluoroethylene copolymer.
2. The wire defined in claim 1 wherein the copolymer is selected from TFE/hexafluoropropylene, TFE/perfluoro(propyl vinyl ether), TFE/hexafluoropropylene/perfluoro(propyl vinyl ether), and blends thereof.
3. The wire defined in claim 1 wherein the foam layer is between 0.05–0.76 mm thick and the skin has a thickness of between 0.013–0.254 mm.
4. The wire of claim 1 or 2 wherein the wire is solid or stranded copper wire of 40 to 20 overall AWG gauge size.
5. Pairs of the wires defined in claims 1, 2 or 3.

* * * * *